United States Patent [19]

Diaz

[11] Patent Number: 4,941,076
[45] Date of Patent: Jul. 10, 1990

[54] START-UP CIRCUIT FOR A HIGH VOLTAGE DC TO AC CONVERTER

[75] Inventor: Bonifacio Diaz, El Paso, Tex.

[73] Assignee: Zenith Electronics Corporation, Glenview, Ill.

[21] Appl. No.: 374,689

[22] Filed: Jun. 30, 1989

Related U.S. Application Data

[62] Division of Ser. No. 256,872, Oct. 12, 1988, Pat. No. 4,872,100.

[51] Int. Cl.$^5$ .................................. H02M 7/5375
[52] U.S. Cl. .................................. 363/49; 363/56; 363/98
[58] Field of Search .............. 323/272; 330/10, 251; 363/41.17, 79, 80, 98, 49, 56, 132

[56] References Cited

U.S. PATENT DOCUMENTS

| 4,347,558 | 8/1982 | Kalinsky | 363/17 |
| 4,714,978 | 12/1987 | Coleman | 361/235 |
| 4,821,163 | 4/1989 | Bloom | 363/49 |

FOREIGN PATENT DOCUMENTS

61-76073  4/1986  Japan.

Primary Examiner—William H. Beha, Jr.

[57] ABSTRACT

A four-quadrant buck converter is described having a common leg of an inductor in series with an output capacitor, one power supply for providing a positive voltage output signal and negative voltage output signal to two solid-state switches joined at a common node, an output transformer whose primary is connected across the output capacitor and a pulse width modulator control circuit for operating the switches to produce a predetermined voltage across said output capacitor and for regulating the current out of the transformer. The control circuitry operates in response to a voltage signal from the output of the power supply, a voltage representative of the voltage at the output of the converter, a high frequency ramp voltage, an internal oscillator voltage, a voltage representative of the RMS current flowing on the secondary side of the output transformer, an under-voltage lockout voltage, and a start-up voltage for slowly starting the converter and protecting against overshoot.

17 Claims, 7 Drawing Sheets

PULSE WIDTH MODULATION OF LOW FREQUENCY WAVEFORM

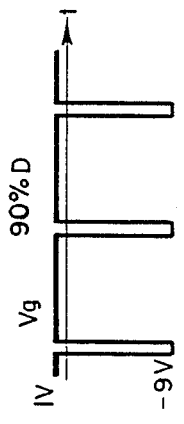
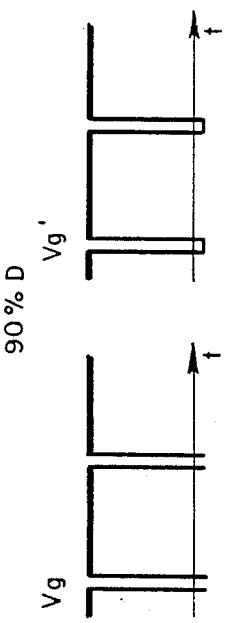
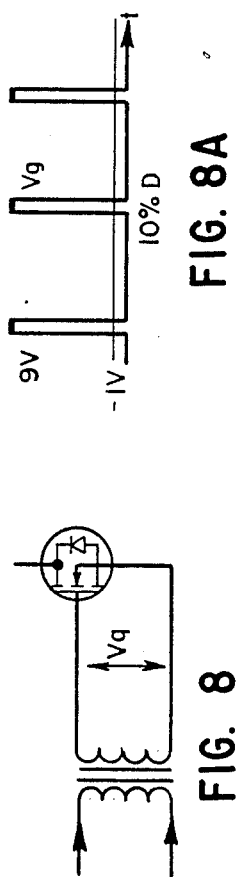
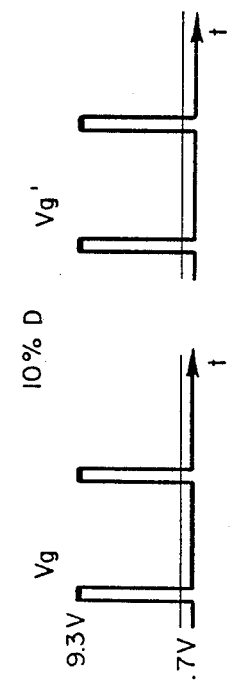

START-UP CIRCUIT FOR A HIGH VOLTAGE DC TO AC CONVERTER

This application is a divisional U.S. patent application Ser. No. 256,872, which was filed on Oct. 12, 1988, and which issued as U.S. Pat. No. 4,872,100 on Oct. 3, 1989.

TECHNICAL FIELD

This invention is related to the general subject of power supplies and, in particular, to the subject of switchmode power converters.

BACKGROUND OF THE INVENTION

Part of the xerography copying process requires a high voltage AC power supply provided by a switch mode power converter. Typically, a high voltage quasi-square waveform is generated using push-pull circuitry and then filtered by an inductor-capacitor low pass filter network (i.e., 500 Hz); U.S. Pat. No. 4,714,978 is an example. The resultant waveform is a distorted sinusoid. Usually, the output frequency of the AC converter is limited to around 400 Hz, due to the inherent losses in the xerography process. A pure sinewave is preferred for low noise content. As the duty cycle of the quasi-square waveform is varied, the distorted sinusoid varies in amplitude; unfortunately, the distortion content also varies. The voltage amplitude is varied by control circuitry to keep a regulated output current. A regulated current is preferred to insure uniform copy quality. This is all the more desirable since current is affected by the age of the components, temperature conditions, dirt, etc.

One modern converter which operates over a 50 percent duty cycle is described in U.S. Pat. No. 4,717,994 to Diaz et al (and assigned to the assignee of the present invention). The control and operation of conventional switched-mode power supplies is covered in the paper "Conceptually New High-Frequency Switched-Mode Power Amplifier Technique Eliminates Current Ripple", by Cuk and Erickson, *Proceedings of POWERCON FIVE*, May 4–6, 1978. U.S. Pat. No. 4,694,386 to de Sartre and U.S. Pat. No. 4,195,335 to Murakami et al describe power supplies which provide automatic start-up. U.S. Pat. No. 3,879,647 to Hamilton et al describes a converter having a soft start capability. Finally, U.S. Pat. No. 4,586,119 to Sutton, describes a switching mode power supply which employs current and voltage feedback and sensing.

SUMMARY OF THE INVENTION

In accordance with the present invention, a unique four-quadrant high voltage DC to AC buck converter is described which is not only suitable for use in xerography but also useful as a Class D amplifier in motor control and in audio amplifier applications. In one basic embodiment, the converter comprises: switching and commutation means for switching current to a common node from a DC power supply using two switches, two capacitors in series with each other and across the power supply, a series capacitor and inductor for joining the common node to the junction of the two capacitors, an output transformer in parallel with the series capacitor, and control means for operating the switching and commutation means to produce a predetermined voltage across the series capacitor. Preferably, the control means produces a pulse width modulated control signal, regulates the output current, is generally responsive to RMS current flow, has a wide ranging duty cycle, a slow start capability, and includes overcurrent protection, under-voltage lockout protection, and overshoot protection on start-up.

Accordingly, one object of the present invention is to provide a high voltage AC power supply or converter which maintains a relatively constant current output and a uniform sinusoidal waveform over prolonged periods and under differing machine operating conditions.

Another object of the invention is to provide a converter which is lower in cost and does not make use of components that require large operating margins, breakdown potentials, or ratings.

Still another object of the present invention is to provide a converter that does not require expensive circuits to convert instantaneous current values to RMS equivalents.

Yet another object of the present invention is to provide a converter which includes pulse width modulation control combined with overcurrent protection, undervoltage lockout protection, and overshoot protection on start-up.

Another object of the present invention is to provide a converter with a wide ranging duty cycle and a slow start capability.

Finally, it is an object of the present invention to provide a unique four-quadrant buck converter that is adapted to pulse width modulation control.

Other features and advantages of the invention will become clear from the following detailed description, the accompanying drawings, and the claims.

BRIEF DESCRIPTION OF THE DRAWINGS

FIGS. 8, 8A, 8B, 9A and 9B depict the operation of the Gate Drive of FIG. 7 in response to changes in duty cycle;

DETAILED DESCRIPTION

Figure 1:
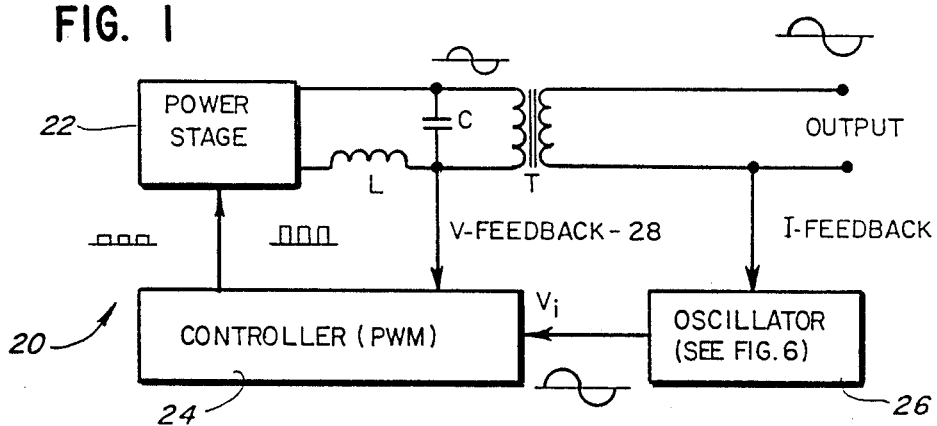
FIG. 1 is a simplified block diagram of the power converter that is the subject of the present invention.

While this invention is susceptible of embodiment in many different forms, there is shown in the drawings, and will herein be described in detail, one specific embodiment of the invention having several specific features It should be understood, however, that the present disclosure is to be considered as an exemplification of the principles of the invention and is not intended to limit the invention to the specific embodiment illustrated and described.

Overview

FIG. 1 shows a block diagram of the DC to high voltage AC converter 20 that is the subject of the present invention. The power stage 22 is a four quadrant switching amplifier. The output of the power stage is stepped up by the output transformer "T" to the desired magnitude. The converter 20 employs a PWM Controller 24 having three feedback loops. One loop, the Current Loop, senses the output current and modulates the amplitude of a low frequency Oscillator 26; accordingly, this loop maintains a constant output current. A second loop, the Voltage Loop 28, senses the voltage waveform at the primary of the output transformer "T". This loop maintains the input voltage waveform a pure sinusoid at all times. The third loop (inside block 22) makes it possible to have a two transistor (or any comparable electronic switch) four-quadrant power stage running off a single DC input power supply. The operation of this third loop will be explained later.

Figure 2:
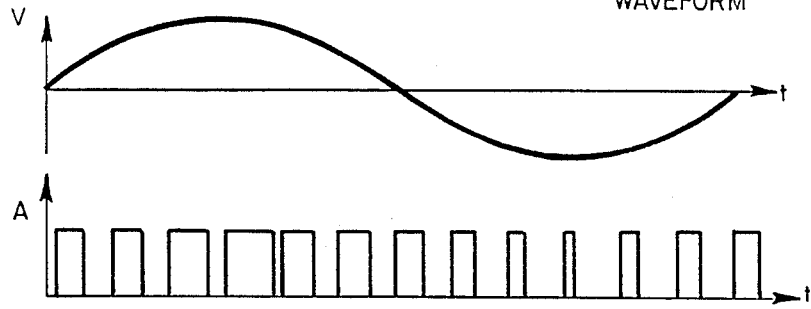
FIG. 2 is a representation of a sinusoidal waveform of the output of the converter of FIG. 1, and the pulse train used to produce it.
Figure 3:
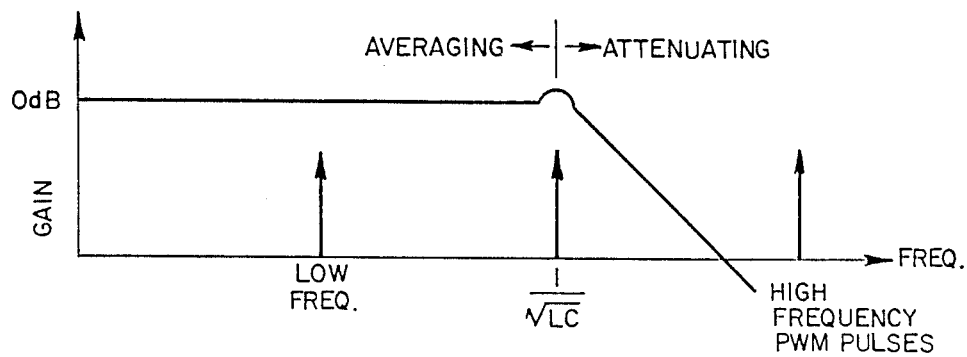
FIG. 3 is a representation of the frequency performance of the converter of FIG. 1.

The output of the low frequency Oscillator 26 is pulse width modulated (See. FIG. 2.) at a much higher frequency by the PWM Controller 24. The pulse width contains both frequency and amplitude information. The high frequency pulses are then fed to the power stage 22 for power amplification. Demodulation is done by an averaging L-C filter (See FIG. 1) with a resonant frequency between the PWM frequency and the sinewave oscillator frequency. Averaging the high frequency pulses extracts the encoded sinewave while attenuating the high frequency pulses (See. FIG. 3).

Figure 4:
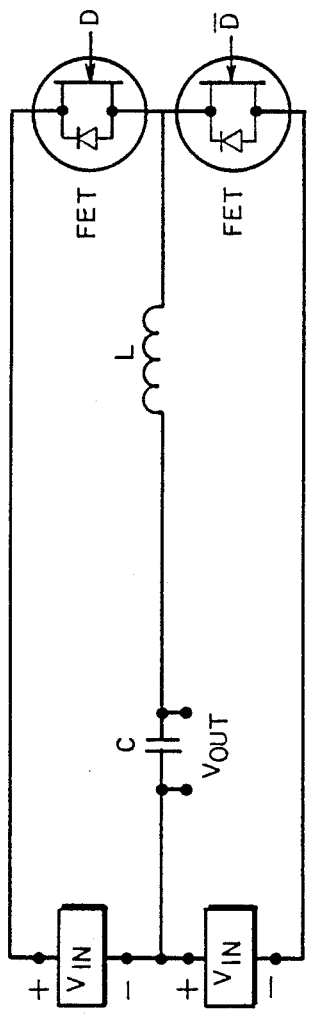
FIG. 4 is a simplified schematic diagram of the power stage of the four-quadrant buck converter of FIG. 1.

FIG. 4 shows a simplified circuit diagram of the Four-Quadrant Power Stage 22. Its performance is that of two back-to-back buck converters joined together with the output filters combined, such that the output AC waveform appears across the capacitor C. The internal drain to source diode in each FET is used as the commutation diode. It requires positive and negative input voltages to operate. This converter can therefore be used as highly efficient AC power amplifier. Since converter stability is important when designing switching power amplifiers, feedback is used to compensate for any distortion due to power stage non-linearity and other variations, such as load and input voltage changes.

Power Stage

Figure 5:
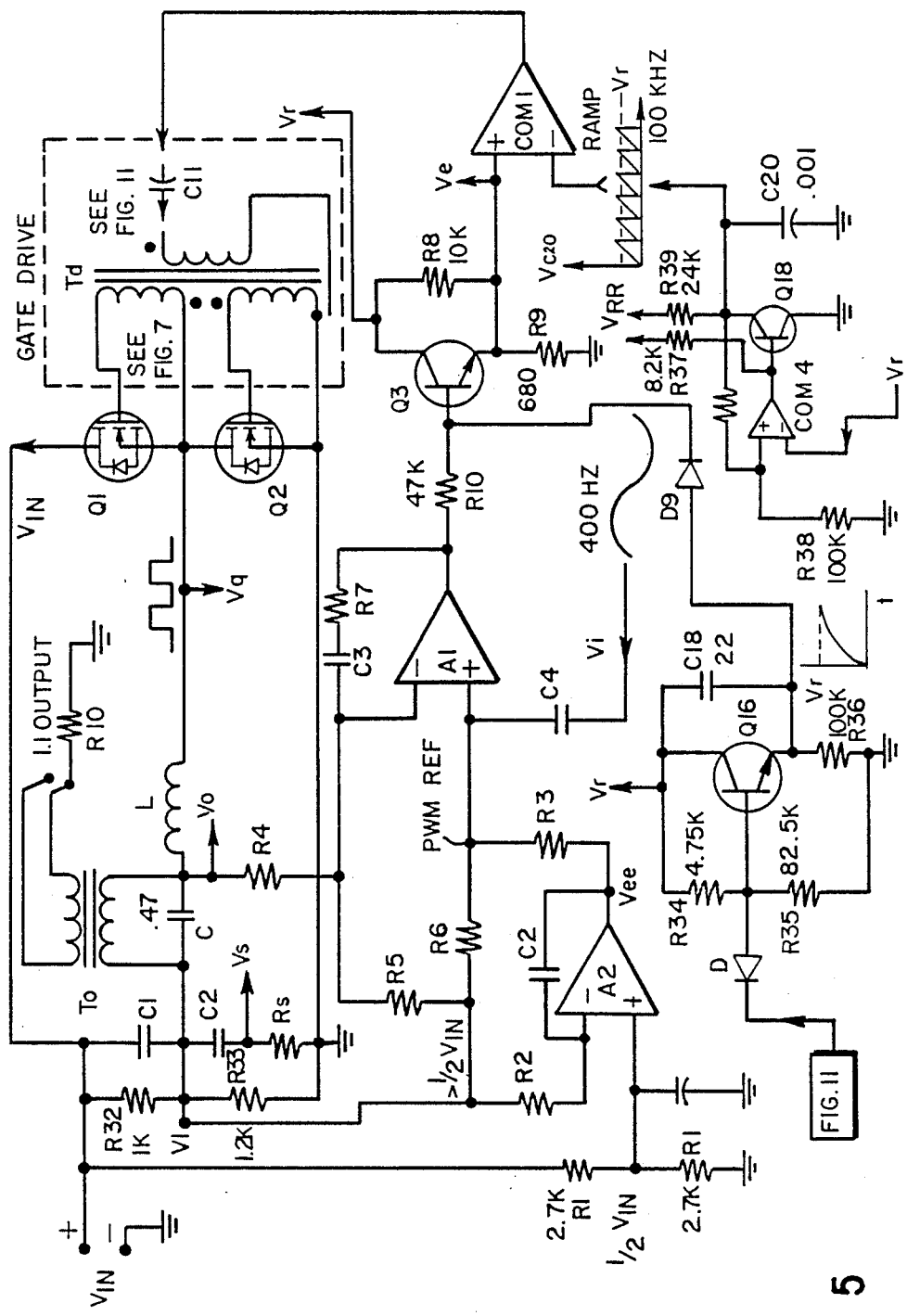
FIG. 5 is a detailed schematic diagram of the converter of FIG. 1 and the associated control circuitry.

Turning to FIG. 5, the Power Stage 22 comprises of a buck type four-quadrant converter running off a single DC input source. This is made possible by using a unique feedback loop. FIG. 5 shows the circuitry. Two capacitors C1 and C2 divide the input voltage essentially in half. This half voltage point V1, is taken as a "ground"; solid-state switches Q1, Q2, inductor L and capacitor C form a four-quadrant buck converter. The output of converter Vo appears across capacitor C. Note that the output Vo equals Vq times the duty cycle D or (Vq * D) minus V1. Voltage point V1 is not low enough in impedance to handle much power, and will easily move up or down. This problem is solved by adding a feedback loop to keep V1 constant at all times. Amplifier A2 compares V1 to ½Vin; if different, an error voltage is fed into the PWM control circuitry 24 which will bring V1 to exactly ½Vin. Capacitors C1 and C2 should be chosen large enough such that, while the loop is responding, the capacitors will keep V1 from moving much. Thus, V1 will have a ripple which depends on the loop response time and the size of capacitors C1 and C2.

Transistors Q1 and Q2 are driven from a common gate drive transformer Td. When switch Q1 is "on", switch Q2 is "off" and vice versa. Current in switches Q1 and Q2 will flow from drain to source, as well as from source to drain (i.e., internal diode). Thus, the internal source-drain diode must provided for fast recovery. Most new FETs now have fast recovery diodes. In addition, when one source-drain diode is conducting and the opposite transistor turns "on", that source-drain diode will be turned "off" forcefully. Here a failure known as "commutating failure", found in motor drives, can occur. Some new FETs have a "source-drain diode commutating safe operating area" specified (i.e., Motorola's MTP-3055D). Other manufacturers (i.e., Fairchild) are expected to have similar devices available with guaranteed safe commutating areas.

PWM Pulse Width Modulator

A pulse width modulator (PWM) is formed by amplifier A1 and comparator Com1. A 400 Hz input signal Vi is fed via a capacitor C4 into the non-inverting input of A1, with V1 used as a reference. The 400 Hz signal is compared to the output voltage Vo which appears across C (resistors R4 and R5 provide proper scaling), and an error voltage appears at the output of A1. Comparator Com1 compares the error voltage Ve to a high frequency (i.e., 100 KHz) ramp and outputs a pulse train whose pulse width is proportional to Ve, and thus Vi. The ramp sets the operating frequency. Its amplitude is set from 0 volts to about 5 percent above Vr. (See top of FIG. 10). Transistor Q3 (2N4401) clamps Ve to Vr; thus, the maximum pulse width is limited to approximately 95 percent. Q3 circuitry (i.e., R8 and R9) also limits minimum Ve to approximately 5 percent of Vr, such that the minimum duty cycle is limited to approximately 5 percent.

The high frequency pulses are amplified by switches Q1 and Q2, and demodulated by filter L and C, as explained before. An amplified Vi signal appears across C and the output transformer To steps it up.

The output transformer To cannot tolerate any DC voltage. For this reason the reference voltage for the PWM controller (i.e., amplifier A1) is chosen as V1 (via resistor R6). In the absence of any input signal (i.e., Vi=0), amplifier A1 generates an error voltage if there is any difference between V1 and Vo. Since at DC, amplifier A1 has high gain, any DC voltage across C will generate a large error signal Ve and any DC voltage across C will be minimized.

Amplifier A2 adds a biasing factor to amplifier A1 reference (via resistor R3), only if V1 drifts away from ½Vin. For Vin=0, the end result is that the voltage across C is zero and V1 equals ½ Vin; this corresponds to a Duty Cycle of 50 percent at the drain (i.e., Vq) of Q2. Since Vo is the average of Vq, we have that Vo=½ Vin which equals V1; this is the loop equilibrium point. C3 and R7 provide compensation for optimum response. R2 and C2 slow the response of amplifier A2, such that amplifier A1 responds faster, and the effect of amplifier A2 is seen as a biasing effect only.

Oscillator—Variable Amplitude, Fixed Frequency

Figures 6, 6A:
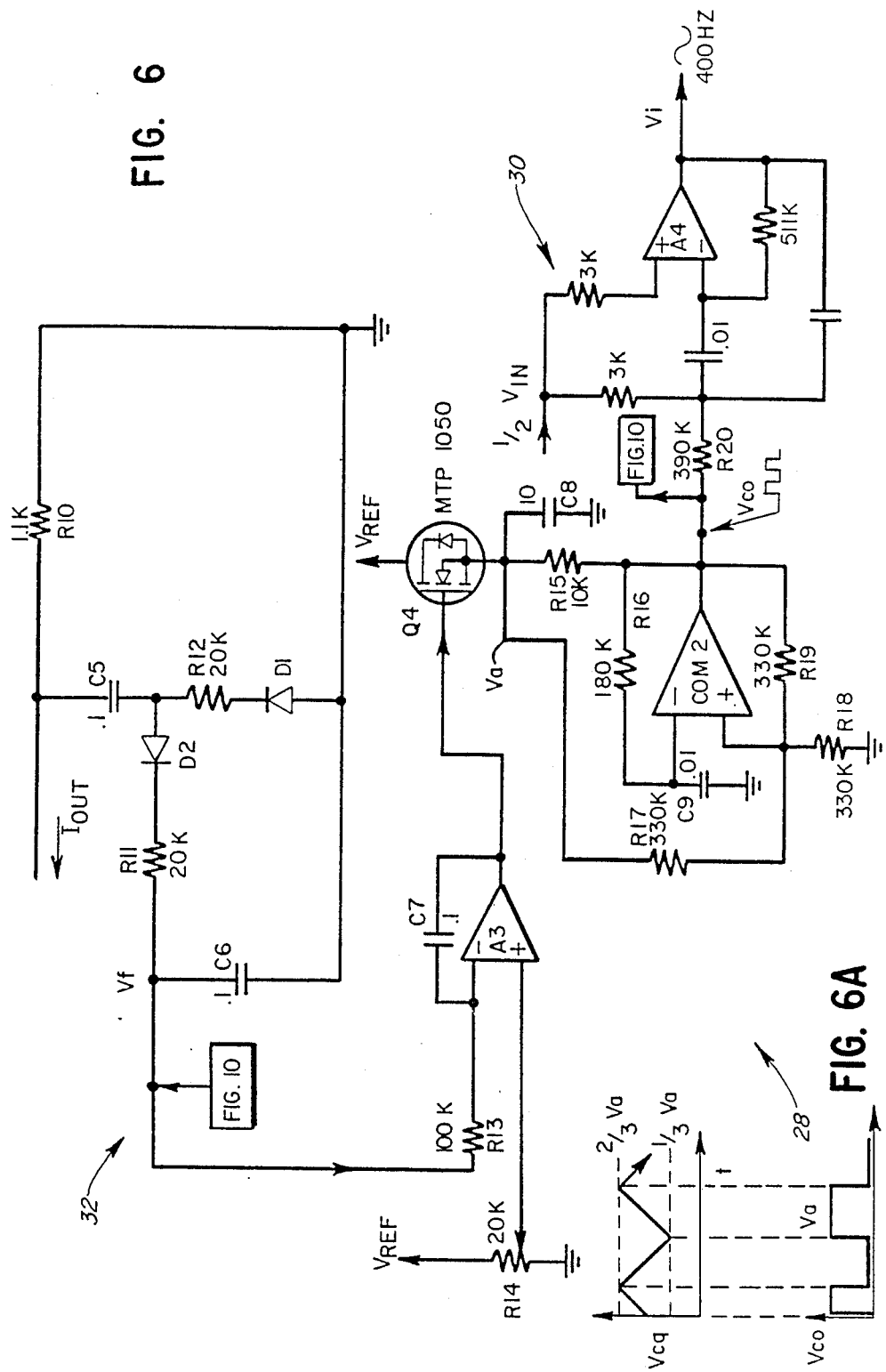
FIG. 6 is a schematic diagram of the Current Regulator, Oscillator, and Band Pass Filter
FIG. 6A depicts the relationship between Vco and Vcq.

FIG. 6 shows the oscillator section and the Current Control Loop. The Oscillator 26 (See FIG. 1) consists of a Squarewave Oscillator 28 feeding into a 400 Hz Bandpass Filter 30. The Bandpass Filter 30 passes only the fundamental frequency and the output is a 400 Hz sinewave. The Squarewave Oscillator 28 uses an amplitude signal provided by a Peak and Averaging Circuit 32.

Comparator Com2 is the heart of the Squarewave Oscillator 28. Assume initially that C9 has no charge. The inverting input of the comparator Com 2 is low and R15 will take the comparator output up to Va, if R15 is much smaller than R16 and R19. The voltage at the non-inverting input will be ⅔ of Va, since R19 equals R18 and R17, and since R19 and R17 are practically in parallel. Capacitor C9 will charge via R16 until voltage at C9 reaches ⅔ of Va. At this time, comparator Com2 will switch states. Its output will now be low and R19 will be in parallel with R18, dropping the noninverting input voltage to ⅓ Va. Now, R16 will discharge C9 until its voltage reaches ⅓ Va. Afterwards, the cycle starts over (see the waveforms at the lower left corner of FIG. 6). The voltage at C9 will oscillate (See FIG. 6A) between ⅓ and ⅔ of Va. Thus, the comparator output Vco will be a squarewave of amplitude Va. Its frequency will be determined by R16 and C9 (if R16 is much greater than R15), and will be independent of Va, since the comparator Com2 always switches when voltage at C9 reaches ⅓ Va and ⅔ Va.

The Bandpass Filter 30 consists of a standard second order bandpass filter with the following parameters: 400 Hz center frequency, unity Bandpass gain and a 60 Hz 3 dB band width. The Bandpass Filter 30 only passes the fundamental of the squarewave and outputs a sinewave at 400 Hz.

Figure 10A:
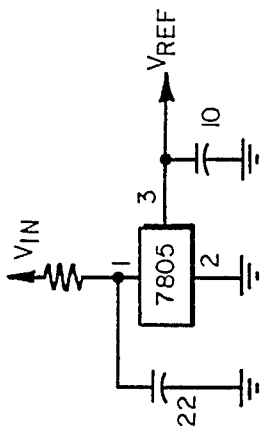
FIG. 10 is a schematic diagram of the Overcurrent Protection section of the converter and FIG. 10A is a schematic diagram of the circuit which produces a reference voltage.

The amplitude of the sinewave is varied to keep the converter-output current $I_{out}$ constant as the load or line changes. This is done with a current loop which controls the voltage Va by operating FET Q4 in the linear region. Since the output current is AC, it first needs to be converted to DC. A RMS to DC converter is preferable, but the cost is relatively high. Using the fact that the RMS value of a rectified AC waveform is somewhere between its average and its peak, a combination of averaging and peak detection can be used when rectifying the output. The output current is sensed by R10. Diodes D1 and D2 established a rectifying doubling circuit. Resistors R11 and R12, and capacitors C5 and C6 provide the proper peak-averaging combination. The voltage Vf at capacitor C6 is a DC equivalent to the RMS value of the output current and is representative of it. Amplifier A3 is the current loop error amplifier. Vf is fed into its inverting input and a reference voltage (See FIG. 10A), set by R14, is fed into its non-inverting input. The output of A3 controls Q4, a FET operated as a variable resistor; therefore, Va is controlled by Amplifier A3. If the load or line changes, A3 will change Va which changes the sinewave oscillator amplitude, which in turn changes the output voltage amplitude and, thus, regulates the output current. Thus, the output current is kept constant (at essentially the RMS value). Potentiometer R14 controls the current set point. R13 and C7 provide proper compensation.

Gate Drive

The Gate Drive for switches Q1 and Q2 must satisfy many requirements. First, it should be low cost. Secondly, it must also prevent switches Q1 and Q2 from conducting at the same time, since they are connected across Vin and simultaneous conduction could be catastrophic. Finally, the duty cycle of each switch should cover a wide range (i.e., from 5 percent to 95 percent). These requirements present a difficult design problem when using a transformer coupled drive.

Figure 7:
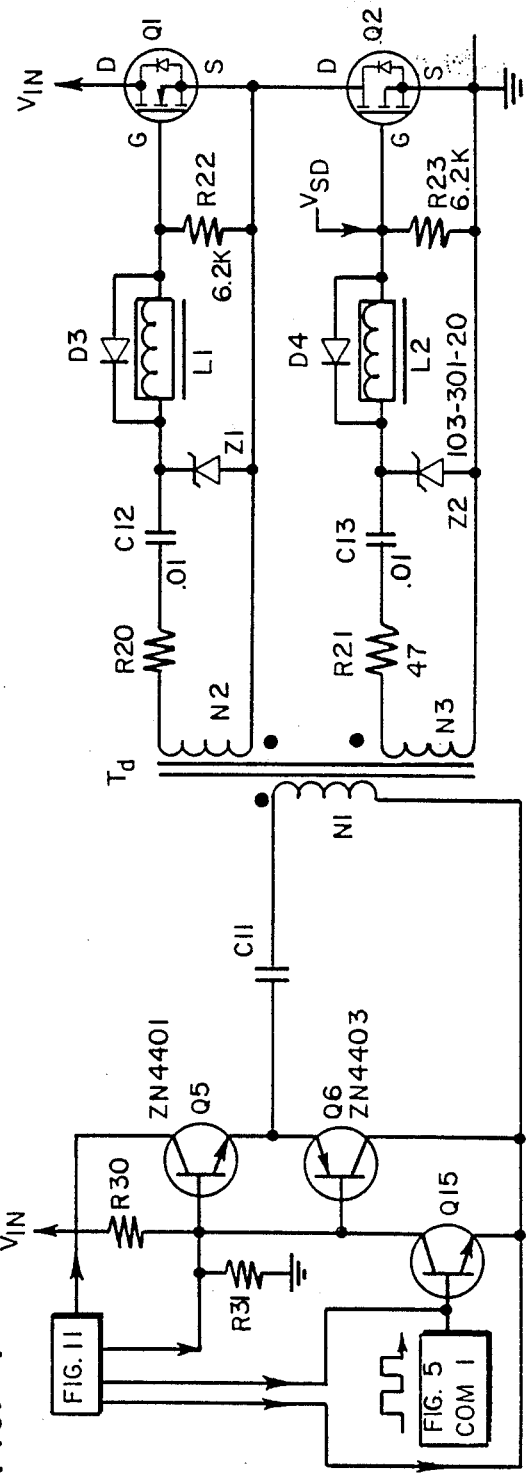
FIG. 7 is a schematic diagram of the Gate Drive.

FIG. 7 shows the Gate Drive used. To solve the problem of simultaneous conduction, which can occur when one FET is being turned "on" and the other is turned "off", a delaying inductor L1 and L2 is added in series with the gate drive circuit. A diode D3 or D4 bypasses the delaying inductor L1 or L2, so that at turn "off" there is no delay. This allows the primary N1 of the drive transformer Td to be driven from a simple "totem pole circuit" (i.e., transistors Q5 and Q6). Its operation will now be described.

Assume that Q5 is "on". This means the "dots" which mark the windings of Td are positive, and Q1 is "off" and Q2 is "on". When Q6 turns "on" the voltage at the Td windings reverses. Q2 is turned "off" immediately, since diode D4 bypasses inductor L2. Q1 is not turned "on" immediately; inductor L1 will delay the gate drive voltage until it saturates, thus delaying Q1 turn-on until Q2 is completely "off". This delay is in the order of 50 nanoseconds only. Thus, the inductors L1 and L2 need only withstand 50 nanoseconds at 10 volts or 500 nano volt-seconds. Using the equation:

$$\text{Saturation Flux density "B"} = \frac{dV * dT}{A * N}$$

the core area and turns can be found, where:
dV=volts
dT=seconds
A=core area
N=turns.

The design problem of providing for a very wide duty cycle range will be explained with the aid of FIG. 8. The gate voltage Vg will vary its positive amplitude as a function of duty cycle. Because any transformer must be volt-second balanced, at low duty cycle (i.e., see FIG. 8A), Vg will be 9 volts high, providing good gate drive. But at a 90 percent duty cycle (see FIG. 8B), the gate drive will only be 1 volt, and the FET will never turn on Referring back to FIG. 7, this problem is solved by providing a level shift as a function of duty cycle (i.e., capacitors C12 and C13, and zener diodes Z1 and Z2). First assume a 90 percent duty cycle (i.e., FIG. 8B) at the gate drive of Q2. When Vg is negative, the diode Z2 will conduct and C13 will charge negatively to 8.3 volts. When Vg switches positive (i.e., 1 volt), the 8.3 volts at C3 will add to the 1 volt providing a 9.3 volt gate drive, which is sufficient for turn-on. On the other hand, Q1 will have a 10 percent duty cycle gate drive. When Vg is negative, the diode Z1 will charge C12 to 0.3 volts. When Vg is positive, the 0.3 volts will add to the 9 volts providing a 9.3 volt gate drive Vg'. The end result is that no matter what the duty cycle is, the gate drive voltage will be constant at 9.3 volts (See FIGS. 9A and 9B).

Capacitor C11 blocks the DC preventing the transformer from saturating. The base of transistor Q15 is connected directly to the comparator Com1 output of the PWM (See FIG. 5).

Overcurrent Protection

Returning to FIG. 5, if the output of the output transformer To is shorted, the associated capacitor C will also be shorted, and the PWM control circuitry will "see" no output voltage. Therefore, the PWM control circuitry will attempt to compensate for this by going to either minimum or maximum duty cycle. The inductor L will then saturate after several switching cycles, inducing high currents in Q1 and Q2. Thus, over current protection is needed.

Figure 10:
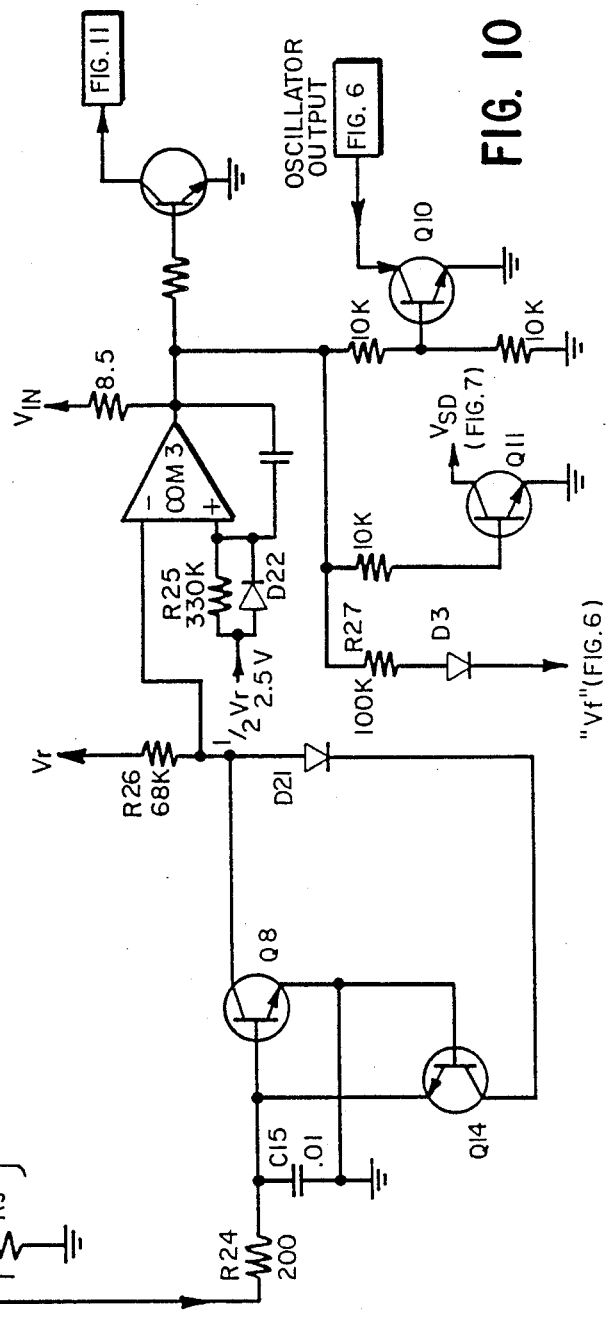

FIG. 10 shows the Overcurrent Protection Circuitry. Resistor Rs senses (See FIG. 5) the current at the ground leg of capacitor C2. Sensing it here has two advantages. The sensed voltage is referenced to ground and the sensed current is approximately equal to ½ the current through L resulting in lower losses. The voltage developed at Rs is filtered by resistor R24 and capacitor C15; this eliminates high frequency noise spikes. The sensed voltage Vs, which proportional to the inductor current Is, is then fed to the base-emitter junctions of transistors Q8 or Q14. If the sensed voltage exceeds approximately 0.6 volts, Q8 or Q14 will turn "on". This triggers comparator Com3 which is configured as a monostable. If Vs is positive, Q8 will turn "on"; if Vs is negative the Q14 will turn "on". Thus, the inductor current is sensed in either direction. A diode D21 in series with Q14 collector prevents Q14 collector from going negative once it turns "on". The monostable is achieved by using positive feedback. The inverting input of Com3 is normally higher than the non-inverting input; therefore, the comparator output is normally "low". When Q8 or Q14 turns "on", the inverting input is pulled low causing the comparator output to switch "high". C16 then pulls the non-inverting input higher than Vr, for a time determined by the values of resistor R25 and capacitor C16; this sets the monostable duration. A diode D22 in parallel with resistor R25 quickly charges C16 back to ½Vr, so it is ready for the next trigger pulse.

Figure 11:
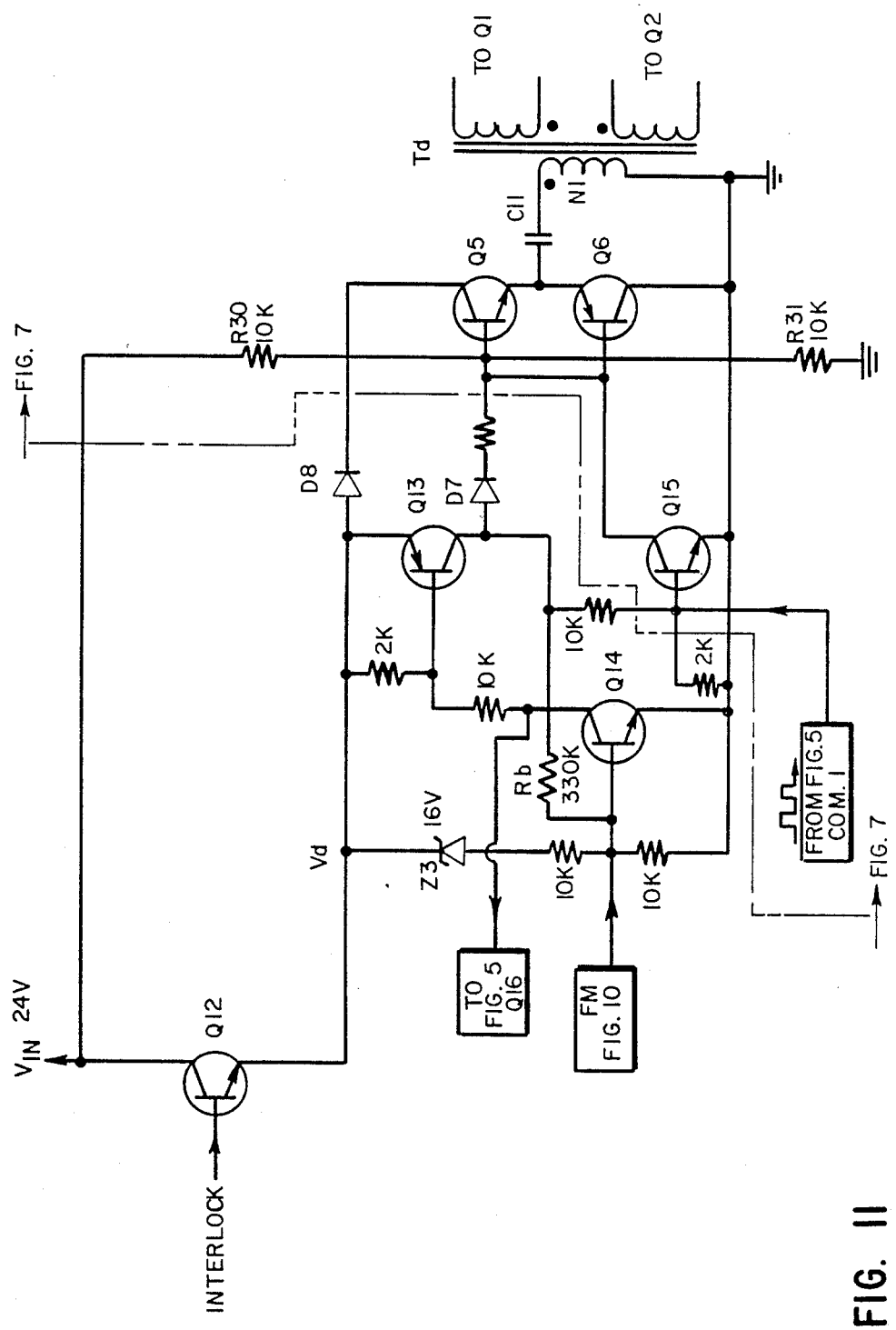
FIG. 11 is a schematic diagram illustrating the operation of the Under Voltage Lockout section of the converter of FIG. 1.

The output of the monostable Com3 drives transistors Q10 and Q11, and FET Q4 (see FIG. 6) which are used to disable other circuits and thereby achieve overcurrent protection:

1. The output of the Squarewave Oscillator (Com2 in FIG. 6) is disabled by Q10;
2. Main FET Q2 is turned "off"; Q11 shorts its gate to ground (see FIG. 7).
3. Diode D3 and R27 charge capacitor C6 (see FIG. 6) providing a "false" current feedback voltage Vf, such that the Squarewave Oscillator input voltage Va (via A3 and Q4) will drop to "0", and during restart it will ramp up slowly.
4. Q15 disables the gate drive to Q1 and Q2 by disabling power to transistors Q5 and Q6 of FIG. 7. Refer to the description of the Undervoltage Lockout circuit (FIG. 11) which is discussed below.

Undervoltage Lockout

In one specific application of the invention, the power supply has provision for a safety input signal called "INTERLOCK". When this input is low, the power supply is disabled When it is at 24 volts, it enables the supply. This INTERLOCK input is connected, as shown on FIG. 11, to a transistor Q12 to provide the power for the gate drive Vd. With the INTERLOCK input low, Vd is at zero volts and the gate drive looses power and the supply shuts down. There is one problem; as Vd is rising, the gate drive voltage may be insufficient, causing poor gate drive.

Therefore, the gate drive should be disabled until Vd is high and stable. This is done as follows: Zener diode Z3 keeps transistor Q14 "off", until Vd is greater than 18 volts. When Q14 turns "on", Q13 is turned "on" and Q13 collector is pulled up to Vd. Resistor Rb provides hysteresis by providing more Q14 base drive, preventing any oscillation. Q13 then supplies base drive to Q15, as well as Q5 and Q6, enabling the gate drive.

Resistors R30 and R31 pre-charge capacitor C11 to ½Vin. To see why this is needed, suppose that C11 is fully discharged, and Q5 and Q6 start switching at 50 percent duty cycle. Eventually, C11 will charge to ½Vin and the voltage at the primary winding N1 of the drive transformer Td will be an AC squarewave. But, while C11 is charging, the voltage at N1 will be unbalanced, being more positive than negative. This causes the gate drive (at switches Q1 and Q2) to be unbalanced also, and it is possible to have both switches Q1 and Q2 "on" at the same time. Pre-charging C11, before the gate drive is enabled, will prevent this problem. Diodes D7 and D8 prevent C11 from discharging when Vg is low. Note that the capacitor pre-charge level must be related to the initial duty cycle (i.e., 50 percent duty cycle, 50 percent precharge), to prevent initial volt seconds imbalance at Td, which brings us to the next protection circuit.

Slow Start—50 Percent Initial Duty Cycle

As was mentioned before, the 50 percent duty cycle operation corresponds to no pulse width modulation for a four-quadrant switching amplifier. So, ideally, the initial duty cycle should be 50 percent and then increase or decrease according to the input signal.

FIG. 5 shows a circuit that provides 50 percent initial duty cycle. V1 is set higher than ½Vin by having resistor R33 about 20 percent higher than R32. With V1 higher than ½Vin, the output of amplifier A2 will be "low", causing the output of amplifier A1 also to go "low". Q3 will be "off" and the duty cycle will be minimum. Because V1 is unbalanced (i.e., greater than ½Vin) every time at startup, the duty cycle will be minimum.

The voltage at the emitter of transistor Q16 is set by R34 and R35; therefore, the error voltage Ve (via diode D9) is clamped to approximately ½Vr which forces the initial duty cycle to equal 50 percent. As the power supply is turned "on", Q16 is turned "off" (i.e., its base grounded) through a connection (via diode D) to the undervoltage lockout circuit previously described (i.e., Q14 collector in FIG. 11). Thereafter, capacitor C18 will slowly charge to Vr via R36. This lets Ve slowly go "low"; thus, the duty cycle is slowly decreased until V1 equals ½Vin at which time the voltage loop is closed.

Apart from the initial duty cycle having to be matched to the gate drive capacitor C11 (see FIG. 11) voltage pre-charge, 50 percent initial duty cycle prevents output overshoot at turn-on. Suppose V1 is more than ½Vin (even 0.01 volts!), and suppose the slow start circuit is not present; the output of A2 will be "low", the output of A1 will be "low", and error voltage Ve will also be "low". The initial duty cycle will be minimum, about 5%. Transistor switch Q2 will be "on" most of the time; since the PWM voltage loop has a finite response time, many high frequency switching cycles will pass before the voltage loop is closed. With Q2 mostly "on", L and the primary winding of To will see a DC voltage approximately equal to ½Vin. The output transformer To will then couple this voltage to the output, until it saturates. Thus, at the output we would have a large transient at turn-on. Inductor L will also saturate endangering Q1 and Q2. As V1 is brought equal to ½Vin, the voltage loop will close and duty cycle will reach 50%. By contrast with the slow start circuit in place, the loop starts at 50 percent (not at some significantly lower value), decreases some to set V1, equal to ½Vin, and returns to 50 percent closed loop equilibrium.

Capacitor C18 and resistor R36 are chosen large enough, such that the duty cycle lowering is slower than the loop response time, preventing the inductor L and the output transformer To from saturating. The output voltage overshoot at turn-on is also reduced by an order of magnitude.

Ramp Generator

The ramp generator is diagramed in the lower right corner of FIG. 5. Assume C20 is initially discharged, the non-inverting input to comparator Com4 is "low", and the inverting input is at reference voltage Vr. Therefore, the Com4 output is "low" and transistor Q18 is "off". Capacitor C20 then charges through resistor R39. Vrr is chosen much higher than Vr, so that the C20 charging current is relatively constant and the voltage at C20 increases linearly. When the voltage at the non-inverting input of Com4 reaches Vr, the comparator switches "high" and Q18 discharges C20 completely. Resistors R37 and R38 are chosen, such that the peak voltage at C20 is approximately 5 percent higher than Vr. Having ramp peak voltage higher than Vr limits the maximum duty cycle of the PWM control circuitry (here that limit is approximately 95 percent). The ramp frequency is set by the values of capacitor C20 and resistor R39.

CONCLUSION

From the foregoing description, it will be appreciated that the invention represents a significant improvement in cost reduction and performance. It is powered by a single DC voltage, thus directly replacing a push-pull type converter. Its output voltage is essentially a non-distorted sinewave at any amplitude. Moreover, by reducing in size the low pass L-C filter, the overall cost is reduced by an order of magnitude. In addition, the electronic power switches Q1 and Q2 require a voltage rating five times lower than an equivalent push-pull type converter, thereby further reducing cost.

From the foregoing description, it will also be observed that simple variations and modifications may be effected without departing from the true spirit and scope of the novel concepts embodied in the present invention. For example, those skilled in the art will know and understand that the heart of the converter is basically a Class D amplifier. Moreover, there are many other applications, as a motor control and as a very efficient Audio Amplifier. Thus, it should be understood that no limitation with respect to the specific apparatus illustrated herein is intended or should be inferred. It is, of course, intended to cover by the appended claims all such modifications as fall within the scope of the claims.

I claim:
1. A high voltage converter, comprising:
    (a) switching means, adapted to be disposed across a power supply, for switching current to and from a common node;
    (b) two capacitors in series with each other at a junction and across said power supply;
    (c) series capacitor and inductor means for joining the common junction between said two capacitors to said common node and for producing a high voltage sinusoidal waveform output;
    (d) control means, comparing the voltage at said junction to a half-voltage derived across said power supply, for providing an output for operating said switching means to produce a predetermined voltage across said series capacitor; and
    (e) starting means for slowly starting said control means such that the initial duty cycle will be approximately fifty percent and then increase or decrease according to the voltage at said junction.

2. The converter of claim 1, wherein said switching means comprises:
    (a) voltage means for providing a voltage approximately equal to one-half of the voltage of the power supply;
    (b) drive transformer means for supplying at least two oppositely wound secondary windings from a primary winding having one end electrically connected to a capacitor; and
    (c) totem pole means, operatively connected across said power supply and to said voltage means and to said output of said control means, for charging said coupling capacitor to approximately one-half of the voltage of the power supply while starting said control means and for operating said drive transformer means thereafter.

3. The converter of claim 2, wherein said voltage means comprises two approximately equal resistors which are joined in series across said power supply; and
    wherein said totem pole means comprises two transistors which are connected at a junction in totem pole across said power supply and which have their bases operatively connected to said output of said control means and to said node between said two approximately equal resistors.

4. The converter of claim 1, wherein said control means comprises comparator means for providing at its output signals to drive said switching means, said comparator means having a ramp voltage at its inverting input and a voltage at its non-inverting input which is clamped to a reference voltage; and
    wherein said starting means comprises timing means for providing a slowly increasing voltage and adding said increasing voltage to said non-inverting input of said comparator, whereby said comparator means output slowly decreases and said duty cycle decreases until the voltage at said junction is approximately equal to said half-voltage.

5. The converter of claim 1, wherein said starting means includes: circuit means for enabling said switching means by providing a voltage thereto after the voltage from said power supply has exceeded a predetermined value.

6. The converter of claim 5, wherein said circuit means comprises: switching means to supply a voltage from said power supply to a bus; and zener diode means for providing voltage from said bus to power said switching means after said bus voltage has exceeded said predetermined value.

7. The converter of claim 6, wherein said switching means comprises:
    (a) two transistors which have their bases connected together at a control node and which are connected in totem pole across said power supply; and
    (b) transistor switch means for connecting said control node to the output of said control means, said transistor switch means having one of its collector and emitter terminals supplied voltage thereto by said circuit means.

8. The converter of claim 4, wherein said timing means comprises: a timing resistor connected to a timing capacitor at a timing node, said timing resistor and timing capacitor being connected between a ground and a reference voltage; and shorting means, operated in response to a voltage provided by said power supply, for adding the equivalent of a short across said timing capacitor when said provided voltage is low and for removing said short when said provided voltage goes high, the voltage at said timing node increasing to a value generally equal to said reference voltage in accordance with the RC time constant of said timing circuit when said short is removed.

9. The converter of claim 8, further including:

voltage clamping means, whose output is operatively connected to said non-inverting input of said comparator means and whose input is operatively connected to said timing node, for providing a voltage clamping function to said comparator means.

10. A high voltage converter, comprising:

(a) switching and commutation means, adapted to be disposed across a power supply, for switching current to and from a common node using two switches;

(b) drive transformer means for driving said switching and commutation means, said drive transformer means including primary winding means;

(c) capacitor means comprising two capacitors in series with each other at a junction and joined across said power supply;

(d) series capacitor means and series inductor means for joining said junction to said common node;

(e) an output transformer whose primary is across said series capacitor;

(f) control means for operating said switching and commutation means to produce a predetermined voltage across said series capacitor means, said control means producing as an output a pulse width modulated control signal which is operatively connected to one end of said primary winding means by coupling capacitor means; and (g) means for pre-charging said coupling capacitor means on start-up of the converter to avoid said two switches being energized at the same time.

11. The converter of claim 10, wherein said switching and commutation means comprises:

(i) two resistors in series with each other across said power supply;

(ii) two transistors which are connected at a common junction in a totem pole across said power supply and which have their bases joined to the node between said two resistors, said one end of said primary winding means being joined to the said common junction of said two transistors by said coupling capacitor;

(iii) zener diode means for providing voltage from said power supply after said power supply voltage has exceeded said predetermined value; and (iv) transistor switch means for operatively connecting said bases to said control means, said transistor switch means having one of its collector and emitter terminals supplied voltage thereto by said zener diode means.

12. The converter of claim 10, wherein said control means comprises:

comparator means for providing an output to drive said switching and commutation means, said comparator means having a ramp voltage at an inverting input; and means for providing, on a start-up of said converter, a slowly increasing voltage to a non-inverting input of said comparator means to have said output of said comparator means slowly decrease and said duty cycle initially decrease.

13. An amplifier, comprising:

(a) a four-quadrant buck converter having a switching and commutation means for switching and commutating current to and from a common node and having a common leg of an inductor in series with an output capacitor, one end of said common leg being joined to said common node;

(b) power supply means for providing a positive voltage output signal and a negative voltage output signal to the other end of said common leg and to said means for switching and commutating current to and from a common (c) an output transformer whose primary is connected across said output capacitor; and (d) pulse width modulated control means, operating in response to voltage signals from each side of said output capacitor, for operating said switching and commutating means to produce a predetermined voltage across said output capacitor and for regulating the current out of said transformer, said control means comprising:

comparator means for providing an output to drive said switching and commutating means, said comparator means having a ramp voltage at an inverting input and a control voltage at a noninverting input which is clamped to a reference voltage; and means, operating on start-up of said amplifier, for providing a slowly increasing voltage and for adding said increasing voltage to said noninverting input of said comparator means to have the duty cycle of said comparator means output initially slowly decreases.

14. The amplifier of claim 13, wherein said control means further comprising:

internal oscillator means;

means for combining the output of said oscillator means and said voltage signals from each side of said output capacitor to produce an input a signal voltage; and means for clamping said input voltage to said reference voltage and providing said control voltage therefrom.

15. A high voltage converter, comprising:

(a) switching and commutation means, adapted to be connected across a power supply, for switching current to and from a common node;

(b) two capacitors in series with each other and across said power supply;

(c) series capacitor and inductor means for joining the common junction between said two capacitors to said common node;

(d) transformer means, having a primary winding across said series capacitor, for producing an AC output; and (e) control means for operating said switching and commutation means to maintain the AC current output generally constant as load changes, said control means including:

a rectifying and doubling circuit for producing from said AC current a DC control voltage whose value is between the average value of the AC waveform and the peak value of the AC waveform, oscillator means, operatively connected to said rectifying and doubling circuit, for producing an output which is at least a function of said DC control voltage and which is generally representative of the RMS value of said AC current, combining means, comparing the voltage across said series capacitor and combining said output of the oscillator means, for providing a voltage for driving said switching and commutation means, slow start means, operated by said power supply, for providing a voltage for driving switching and commutation means to have an initial duty cycle of approximately fifty percent before said voltage across said series capacitor exceeds a predetermined value, and an undervoltage lockout circuit for enabling said switching and commutation means by providing a voltage thereto after the voltage across said power supply has exceeded a predetermined value.

16. A high voltage converter, comprising:
(a) switching means, adapted to be disposed across a power supply, for switching current to and from a common node, said switching means including:
voltage means for providing a voltage approximately equal to one-half of the voltage of the power supply,
two transistors which are connected at a junction in totem pole across said power supply and which have their bases operatively connected to said voltage means; and
drive transformer means, having a primary winding electrically connected in series with a capacitor to said junction, for driving two switches to supply current to and from said common node, (b) two capacitors which are connected in series with each other at a capacitor junction and across said power
(c) series capacitor and inductor means for joining said capacitor junction to said common node and for producing a high voltage sinusoidal waveform output;
(d) control means, operating in response to the difference between a high frequency ramp voltage and a lower frequency voltage which is representative of the voltage across said series capacitor and a half-voltage derived from said power supply, for supplying an output control signal to said bases of said two transistors to operate said two switches to produce a predetermined voltage across said series capacitor; and
(e) starting means for slowly starting said control means such that the initial duty cycle will be approximately fifty percent and then increase or decrease according to the voltage across said series capacitor, said starting means including:
transistor switch means for joining said bases of said two transistors to said output of said control means after a voltage derived from said power supply has exceeded a predetermined value,
a timing resistor connected to a timing capacitor at a timing node, said timing capacitor being connected to a reference voltage and said timing resistor being connected to a ground, and
shorting means for adding the equivalent of a short across said timing capacitor before said transistor switch means becomes operative and for removing said short after said transistor switch means becomes operative, the voltage at said timing node increasing to a value generally equal to said reference voltage in accordance with the RC time constant of said timing circuit when said short is removed.

17. The converter of claim 16, wherein said transistor switch means comprises zener diode means, for providing a voltage from said power supply to turn on a transistor switch which connects said bases to said output of control means after the voltage of said power supply has exceeded said predetermined value.

* * * * *